July 1, 1969

J. ZAKHEIM ET AL 3,453,625

RADIAL SPEED MEASURING DEVICE FOR CLOCK TRAJECTOGRAPHY

Filed Feb. 26, 1968

INVENTORS:
Jacques ZAKHEIM,
Georges L. DUMONT &
Francois M. DUNAND
By Abraham A. Saffitz
ATTORNEY

United States Patent Office 3,453,625
Patented July 1, 1969

3,453,625
RADIAL SPEED MEASURING DEVICE FOR CLOCK TRAJECTOGRAPHY
Jacques Zakheim, Paris, Georges L. Dumont, Malakoff, and Francois M. Dunand, Paris, France, assignors to Office National d'Etudes et de Recherches Aerospatiales, Chatillon-sous-Bagneux, France, a body corporate of France
Filed Feb. 26, 1968, Ser. No. 708,309
Claims priority, application France, Mar. 1, 1967, 97,063
Int. Cl. G01s *3/02*
U.S. Cl. 343—112                       2 Claims

ABSTRACT OF THE DISCLOSURE

The method of clock trajectography which is often used for localizing missiles provided with an emitter of recurrent radio-electric pulse signals the carrier frequency of which is controlled by an atomic clock, involves the measure of the radial speed of the missile from a given number of fixed receiving stations. These pulses being too short for enabling an accurate measure of the Doppler effect due to the radial speed each receiving station comprises a first stable local oscillator controlled by an atomic clock at the said carrier frequency and a second adjustable local oscillator controlled by the carrier receiving frequency and means for comparing the output signals of said first and second local oscillators.

---

The invention relates to measurement of the radial speed of a moving source of high-frequency pulse signals.

As is known, the speed of a moving object can be found by measuring its radial speed with respect to three fixed points with known coordinates, provided the position of the moving body is known. When the method of clock trajectography is used, the position of the moving object is found by measuring its distance from the time taken for a radio-electric pulse to travel to each fixed point from the moving object. The instants when the pulse is emitted and received are determined by synchronized atomic clocks in the moving object and at each of the fixed points. The repetition frequency of pulses emitted by the moving object is not less than its maximum distance from the measuring points divided by the speed of light. The distance measurement thus gives a clear result.

Pulse signals used in trajectography do not, however, give an accurate measurement of the radial speed, with the result that the speed of the moving object cannot be determined without inadmissible errors. This is because these pulse signals being very short the number of beat cycles between the local signal and each received signal, to be counted to the nearest unit, is too small.

An object of the invention is to enable accurate measurement to be made of the radial speed of a moving object emitting pulse signals suitable for clock trajectography.

The device according to the invention, for measuring the radial speed of a moving body emitting recurrent pulse signals consisting of short wave trains suitable for clock trajectography, comprises a stable local oscillator emitting a continuous signal at the same nominal frequency as the pulse signal carrier, a local oscillator controlled at the same frequency and phase as the carrier receiving frequency, and means for comparing the output signals from the local oscillators so as to obtain a beat signal corresponding to the radial speed to be measured.

Another feature of the measuring device according to the invention is that the frequency of the stable local oscillator can be offset with respect to the nominal frequency of the carrier wave of the pulse signals emitted by the moving object, the offsetting of the local oscillator frequency being a fraction of the carrier wave frequency which is not less than the maximum variation in this frequency due to the Doppler effect. The direction of movement can therefore be determined.

Figure 1:
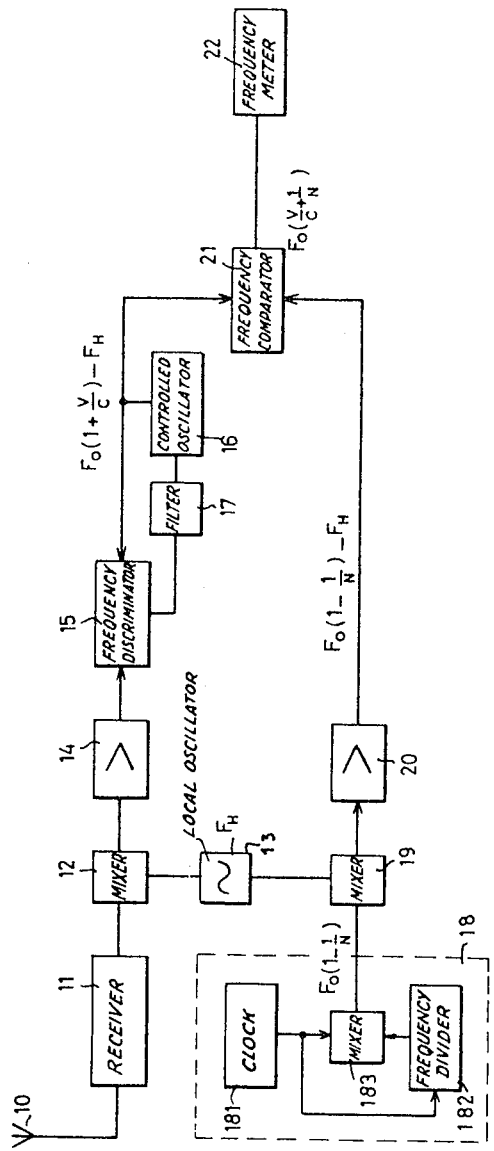
Figure 2:
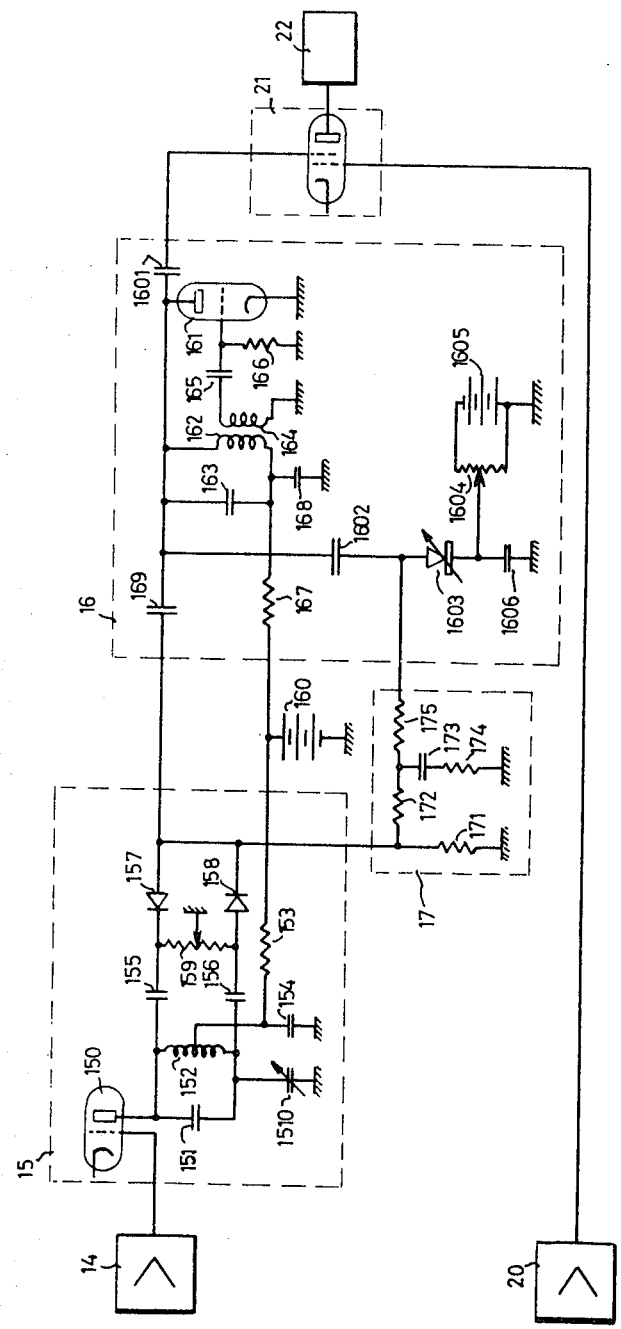

The invention will be more clearly understood from the following description and annexed drawings, in which:

FIG. 1 is a block diagram of a radial speed measuring device according to the invention, and FIG. 2 is an embodiment of part of a device according to FIG. 1.

The radial speed measuring device shown in the block diagram in FIG. 1 comprises, firstly, an antenna 10 and a high-frequency reception circuit 11 for receiving from the moving object wave trains having a nominal carrier frequency $F_O$ which is received with a Doppler effect $V/c$ equal to the ratio of the radial speed $V$ of the moving object to the speed $c$ of light; secondly, the measuring device comprises a very stable time base 18 whose frequency will for the present be assumed equal to $F_O$, for simplicity. The output signals from reception circuit 11 and time base 18 are applied to frequency-changers 12 and 19 respectively, where they are mixed with a sinusoidal of frequency $F_H$ from a local oscillator 13. The output signals of frequency changer 12, which are wave trains of the same length as the pulses emitted by the moving object but having a carrier equal to the difference between the carrier modified by the Doppler effect $$F_O\left(1+\frac{V}{c}\right)$$

and $F_H$, are applied via an amplifier 14 to one input of a frequency discriminator 15, the output signal of a variable-frequency oscillator 16 being applied to the other input of discriminator 15. The output of discriminator 15 is connected to the frequency control input of oscillator 16 via filter 17. This forms a control loop, causing oscillator 16 to deliver a continuous wave at a frequency equal to $$F_O\left(1+\frac{V}{c}\right)-F_H$$

which is applied to one input of a frequency comparator 21 whose second input receives the output signal of frequency changer 19 via an amplifier 20. If the signal from 19 has a frequency equal to $F_O-F_H$, frequency comparator 21 outputs a signal whose frequency $F_OV/c$ is equal to the Doppler effect under investigation and is measured by a frequency-meter 22. It can be seen that if the frequency of the signal supplied by time base 18 is $F_O$, the measurement of the output signal frequency from frequency comparator 21 gives the absolute value of the Doppler effect but does not show whether the moving object is receding or approaching.

To obtain this information, time base 18 comprises a clock 181, e.g. an atomic clock, which is exactly similar to the clock controlling the transmitter on the moving object and which consequently supplies a signal at $F_O$. The time base 18 also comprises a frequency divider 182 and a mixer 183. When signals from clock 181 at frequency $F_O$ and from divider 182 at frequency $F_O/N$ are applied to the two inputs of mixer 183, a signal of frequency $$F_O\left(1-\frac{1}{N}\right)$$

appears at the mixer output. This signal is filtered, amplified, and applied to the input of frequency changer 19, which also receives the signal at frequency $F_H$ from local oscillator 13. The frequency of the signal selected at the output of frequency changer 19 is therefore $$F_0\left(1-\frac{1}{N}\right)-F_H$$

so that the output signal of frequency comparator 21 has the frequency $$F_0\left(\frac{V}{c}+\frac{1}{N}\right)$$

The dividing factor N in frequency divider 182 is chosen so that $1/N$ is larger than the maximum absolute value of $V/c$. Under these conditions, every value of $$F_0\left(\frac{V}{c}+\frac{1}{N}\right)$$

greater than $F_0/N$ corresponds to a radial approaching speed, and every value below $F_0/N$ corresponds to a radial receding speed.

FIG. 2 is a diagram of an embodiment of circuits 15, 16, 17 and 21 in FIG. 1. The frequency discriminator 15 comprises a triode 150 to whose grid wave trains from amplifier 14 are applied, and whose plate has a load in the form of an oscillating circuit comprising a capacitor 151 in parallel with an inductor 152 powered at its center by a positive voltage source 160 via a resistor 153 and connected to earth via a decoupling capacitor 154. Signals in phase opposition are thus obtained at the common terminals of capacitor 151 and inductor 152; the balance between these two signals can be adjusted by a variable capacitor 1510. The signal are respectively applied via capacitor 155 to the cathode of a diode 157 and via capacitor 156 to the anode of a diode 158. The anode of diode 157 and the cathode of diode 158 are connected at the output of oscillator 16 and at the input of filter 17, where they are connected to earth by a bias resistance 171. The cathode of diode 157 and the anode of diode 158 are also connected via a resistance 159 having a potentiometer balancing earth tapping at its center. The resulting voltage at the terminals of resistor 171 varies with the phase shift between the wave train carrier from amplifier 14 and the continuous signal supplied by oscillator 16. This voltage is applied via a resistor 172 to one plate of a capacitor 173 whose second plate is connected to earth via a resistance 174. The charge voltage of capacitor 173 is applied via resistance 175 to the frequency control input of oscillator 16. Oscillator 16 comprises a triode 161 whose anode load is an oscillating circuit comprising a capacitor 163 and an inductor 162 coupled to an inductor 164 which is connected to earth at one end and, via a capacitor 165 at the other end, to the grid of triode 161 which is biased by a resistance 166 connected to earth. The oscillating circuit 162, 163 is also connected to the positive source 160 by a resistor 167 and to earth by a capacitor 168. The plate of triode 161 is connected via capacitor 169 to diodes 157 and 158, via capacitor 1601 to one input of mixer 21, and via a capacitor 1602 to the anode of a variable capacitance diode 1603 whose cathode is biased at a voltage which can be regulated by a potentiometer 1604 and a voltage source 1605 and connected to earth by a capacitor 1606. The anode of variable capacitance diode 1603 is biased by the output voltage of low-pass filter 17. The frequency of oscillator 16 is therefore controlled by the charge voltage of capacitor 173 and is adjusted in frequency and phase to frequency $$F_0\left(1+\frac{V}{c}\right)-F_H$$

of the carrier wave of wave trains supplied by amplifier 14. Frequency comparator 21 may for example be a valve having two grids receiving the output signal from oscillator 16 and amplifier 20 respectively so that the valve plate records the Doppler effect resulting from a comparison between the two continuous waves.

What we claim is:

1. A radial speed measuring device for clock trajectography including a moving source of recurrent pulse signals consisting of wave trains whose carrier frequency is exactly determined but which are too short for the Doppler effect to be accurately measured, and a fixed receiving station comprising receiving means adapted to receive the signals of said moving source, a first stable local oscillator emitting a continuous signal at the same frequency as said carrier frequency in combination with a second adjustable local oscillator, means for synchronizing the frequency and phase of said second local oscillator to the carrier received frequency and means for comparing the output signals from the said first and second local oscillators whereby a beat signal corresponding to the radial speed of said moving source is obtained.

2. A radial speed measuring device according to claim 1 in which the frequency of said first stable local oscillator is offset relative to said carrier frequency, by a fraction of said carrier frequency not less than the maximum possible difference due to the Doppler effect between said carrier frequency and said carrier received frequency.

References Cited
UNITED STATES PATENTS 2,218,907  10/1940  Donnelly et al.
3,281,845  10/1966  Bjorkman.

RICHARD A. FARLEY, *Primary Examiner.*

RICHARD E. BERGER, *Assistant Examiner.*